(12) United States Patent
Buxton (10) Patent No.: US 9,833,894 B2
(45) Date of Patent: Dec. 5, 2017

(54) TELESCOPING RETRIEVING DEVICE WITH FLEXIBLE PORTION

(71) Applicant: Kenn Stephen Buxton, North Vancouver (CA)

(72) Inventor: Kenn Stephen Buxton, North Vancouver (CA)

(*) Notice: Subject to any disclaimer, the term of this patent is extended or adjusted under 35 U.S.C. 154(b) by 0 days.

(21) Appl. No.: 15/302,778

(22) PCT Filed: May 4, 2015

(86) PCT No.: PCT/CA2015/050386
§ 371 (c)(1),
(2) Date: Oct. 7, 2016

(87) PCT Pub. No.: WO2015/176176
PCT Pub. Date: Nov. 26, 2015

(65) Prior Publication Data
US 2017/0021494 A1    Jan. 26, 2017

(30) Foreign Application Priority Data
May 23, 2014   (CA) ................................. 2852459

(51) Int. Cl.
| | | |
|---|---|---|
| *B25J 15/00* | (2006.01) | |
| *B66C 1/00* | (2006.01) | |
| *B25J 1/02* | (2006.01) | |
| *B25B 9/00* | (2006.01) | |

(52) U.S. Cl.
CPC .. *B25J 1/02* (2013.01); *B25B 9/00* (2013.01)

(58) Field of Classification Search
CPC .... B25J 1/02; B25J 1/04; B25B 39/00; E01H 2001/1293; A01B 1/18; A01D 46/247; A01D 46/24; A01D 46/005; A01D 51/002; A01D 51/00
See application file for complete search history.

(56) References Cited

U.S. PATENT DOCUMENTS

| | | | | |
|---|---|---|---|---|
| 2,947,564 A | * | 8/1960 | Winther | ............ B25J 1/04 294/100 |
| 5,317,939 A | * | 6/1994 | Marinescu | .......... H01K 3/32 294/100 |
| 5,570,919 A | | 11/1996 | Eusebe | |

(Continued)

FOREIGN PATENT DOCUMENTS

CA       2714868 A1    3/2012

*Primary Examiner* — Stephen Vu
(74) *Attorney, Agent, or Firm* — Cotman IP Law Group, PLC (57) ABSTRACT

The present technology provides a device for retrieving objects. The device has a proximate elongate member (120) extending from a handle (110) and a flexible elongate member (130) coupled with the proximate elongate member and slidable between a retracted configuration and an extended configuration. The device has a holding member (140) operatively coupled with the flexible elongate member. Some embodiments have an actuating system configured to operate certain types of holding members with an actuating member (113) to enable the holding member to hold/release an object. Some embodiments have a locking system configured to lock the flexible elongate member to the proximate elongate member.

12 Claims, 4 Drawing Sheets

(56) References Cited

U.S. PATENT DOCUMENTS

| | | | |
|---|---|---|---|
| 8,585,114 B2* | 11/2013 | Kovarik | B25J 1/02 294/111 |
| 2010/0201142 A1* | 8/2010 | Tu | B25J 1/04 294/210 |
| 2011/0197825 A1* | 8/2011 | Jan | E01H 1/1206 119/795 |
| 2014/0054912 A1 | 2/2014 | Bustos | |

* cited by examiner

TELESCOPING RETRIEVING DEVICE WITH FLEXIBLE PORTION

FIELD OF THE TECHNOLOGY

The present technology relates to hand tools for grabbing and extending the reach of a person. The present technology more particularly relates to an extendable tool with a flexible elongate portion for reaching around bends and grabbing objects.

BACKGROUND OF THE TECHNOLOGY

Hand held retrieving devices for gripping and/or picking up objects are known. They typically employ a jaw or magnetic portion that is coupled with a handle via a central portion. Such "grippers" typically have fixed length central portions or a two-part construction that permits articulation or telescoping of the central portion so that it can be compacted. Some telescoping retrieving devices provide adjustable length for ergonomic reasons. Example references describing various types of retrieving devices include Chinese Patent No. 201889794, German Patent No. 1,171,354, U.S. Pat. Nos. 4,483,562, 5,620,447, 8,042,848 and 8,585,114, United States Patent Application Publication Nos. 2005/200143 and 2014/054912, and International Patent Application Publication No. 2009/126334. There is, however, still a long felt but unsolved need for an extendable retrieving device that facilitates reaching around bends or corners that are otherwise inaccessible to traditional retrieving devices.

BRIEF SUMMARY OF THE INVENTION

The present technology provides a telescoping retrieving device with a flexible portion. According to an embodiment of the present technology there is provided a device for retrieving an object, the device comprises a handle; a proximate elongate member extending from the handle; a flexible elongate member slidably coupled with the proximate elongate member, the flexible elongate member slidable between a retracted configuration and an extended configuration; a holding member operatively coupled with a distal end of the flexible elongate member, the distal end being distal from the proximate elongate member; and an actuating system having an actuating member, the actuating system configured to operatively engage the actuating member and the holding member in at least the extended configuration of the flexible elongate member and thereby allow actuating the holding member to hold the object by actuating the actuating member.

According to an embodiment of the present technology there is provided a device for retrieving an object, the device comprises a handle; a proximate elongate member extending from the handle; a flexible elongate member slidably coupled with the proximate elongate member, the flexible elongate member slidable between a retracted configuration and an extended configuration; a holding member operatively coupled with a distal end of the flexible elongate member, the distal end being distal from the proximate elongate member; and a locking system configured to releasably lock the flexible elongate member to the proximate elongate member.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The embodiments of the invention will be described by reference to the following drawings thereof.

DETAILED DESCRIPTION

The present technology provides a retrieving device with an extendable central portion that facilitates reaching around bends or corners while also providing a level of rigidity/stiffness in the central portion for accurate and/or reliable object retrieval. The retrieving device provides a handle and a holding member that are operatively coupled via the central portion. The central portion comprises a flexible elongate member and a proximate elongate member that are slidingly coupled to each other and extendable between a retracted configuration and an extended configuration. The retrieving device has a short length in the retracted configuration to facilitate stowage and transport, for example.

In some embodiments, the flexible elongate member is configured to allow continuous or discrete bending by hand into various different shapes. The flexible elongate member may be configured to provide resilience against further deformation once bent. In some embodiments, the flexible elongate member is configured to allow locking it in one of one or more bent shapes. Achievable curvatures of the flexible elongate member may be different in different embodiments.

In some embodiments, the holding member can be actuated and the retrieving device further comprises an actuating system that is configured to operate the holding member and allow holding an object by operating an actuating member. In some embodiments, the actuating member is part of the handle and configured to be operable with the same hand that can be used to hold the handle. In some embodiments, the actuating system may be configured to extend, at least in part, through an inside of the central portion.

Depending on the embodiment, the handle may be disposed relative to the proximate elongate member at different locations, for example along the length of the proximate elongate member or at an end of the proximate elongate member that is distal to the holding member. In some embodiments, the handle may be integrally formed with the proximate elongate member. In some embodiments the handle can be disposed proximate or distal of the actuating member. As such different handle configurations may be employed. Depending on the embodiment, the handle and/or other parts of the retrieving device may be configured to allow operation of the retrieving device as well as the actuating system, if present, with one or two hands by pulling or pushing the actuating member relative to the handle about a fulcrum or along a translational direction, or by rotating (twisting or turning) the actuating member relative to a respective axis.

Depending on the embodiment, the holding member can have different configurations. For example, the holding member can include a mechanical, a magnetic or other holding member and/or combinations thereof. A mechanical holding member may be configured to grab, grip, claw, pinch, stab, prick or otherwise engage an object. Example mechanical holding members can include a claw, a grasp, a gripper, a hook, a pincer, a needle or sharp point or other mechanical holding member and/or combinations thereof. A magnetic holding member can include a permanent magnet or an electromagnet and/or combinations thereof. A mechanical holding member can include multiple claws of adequate stiffness or a jaw with multiple fingers that can have multiple digits or other configuration or combination thereof. Different components of the holding member can have different rigidity or stiffness, adhesion or other properties to provide different dexterity. Different types of holding members may be suitable for different applications. For example, a retractable claw may be preferred over a claw with a jaw for use in tight spaces because of space constraints to preserve visibility and provide more room to maneuver.

In some embodiments, the retrieving device further comprises one or more locking systems with one or more releasable locks for securing the length of the central portion. The releasable lock is configured to prohibit sliding of the proximate elongate member relative to the flexible elongate member in the locked configuration. Some example releasable locks are described in more detail herein. Depending on the embodiment, such and other types of telescoping tube locks can be employed. Furthermore, in some embodiments, the proximate elongate member and the flexible elongate member are locked in place and prohibited from sliding via a friction fit coupling or other coupling mechanism. Such a friction fit coupling can be configured based on the weight of the objects that the retrieving device is intended to carry in order to resist further sliding under load conditions. In some embodiments, the locking system is configured to secure the central portion only in the extended configuration. In some embodiments, the locking system may be configured to secure multiple lengths of the central portion.

The flexible elongate member may be configured to provide some flexibility depending on the weight of the objects that the retrieving device is intended to be able to carry/hold and the ease at which it can be bent before or while reaching inside remote places. In some embodiments, even the proximate elongate member can provide some flexibility which may also depend on the weight of the objects that the retrieving device is intended to carry/hold to limit bending under load conditions. In some embodiments, the proximate elongate member and/or the flexible elongate member can comprise one or more respective interlocking members. Multiple interlocking members may be coupled in an extendible, for example, in a telescoping or other manner. Depending on the embodiment, interlocking members can have a tubular configuration.

Figure 1A:
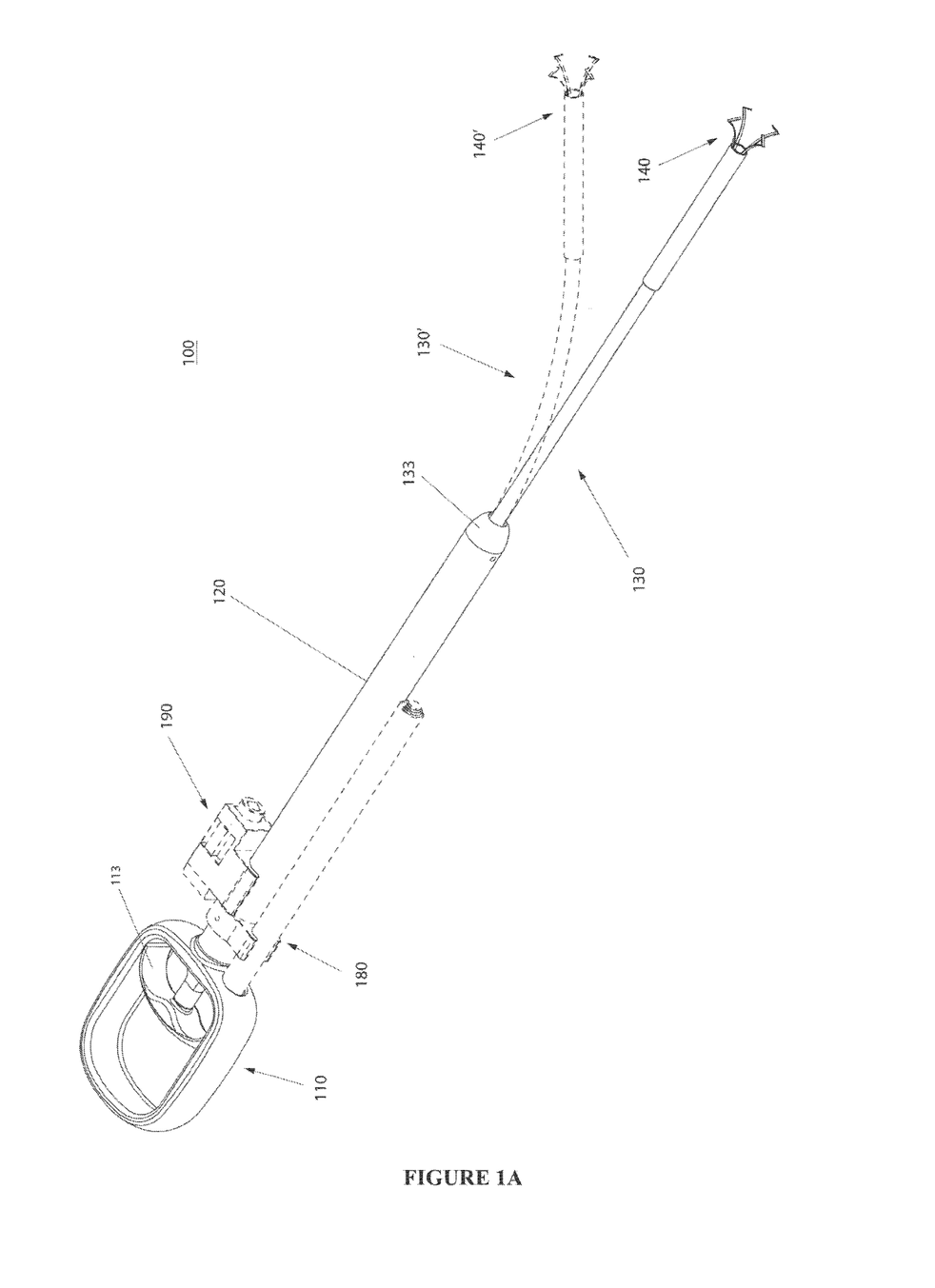
FIG. 1A illustrates a perspective view of an embodiment of a retrieving device in an extended configuration.
Figure 1B:
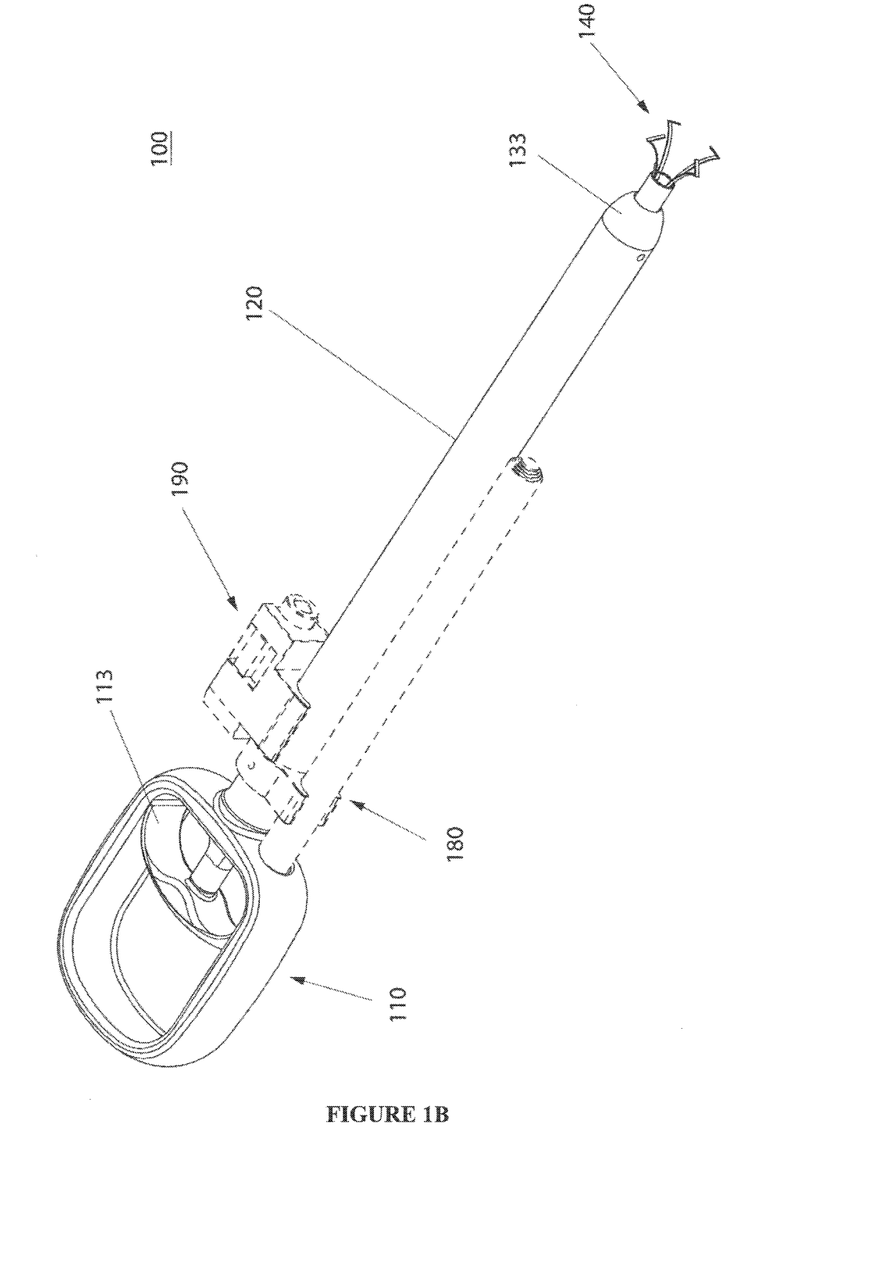
FIG. 1B illustrates a perspective view of the retrieving device of FIG. 1A in a retracted configuration.
Figure 2:
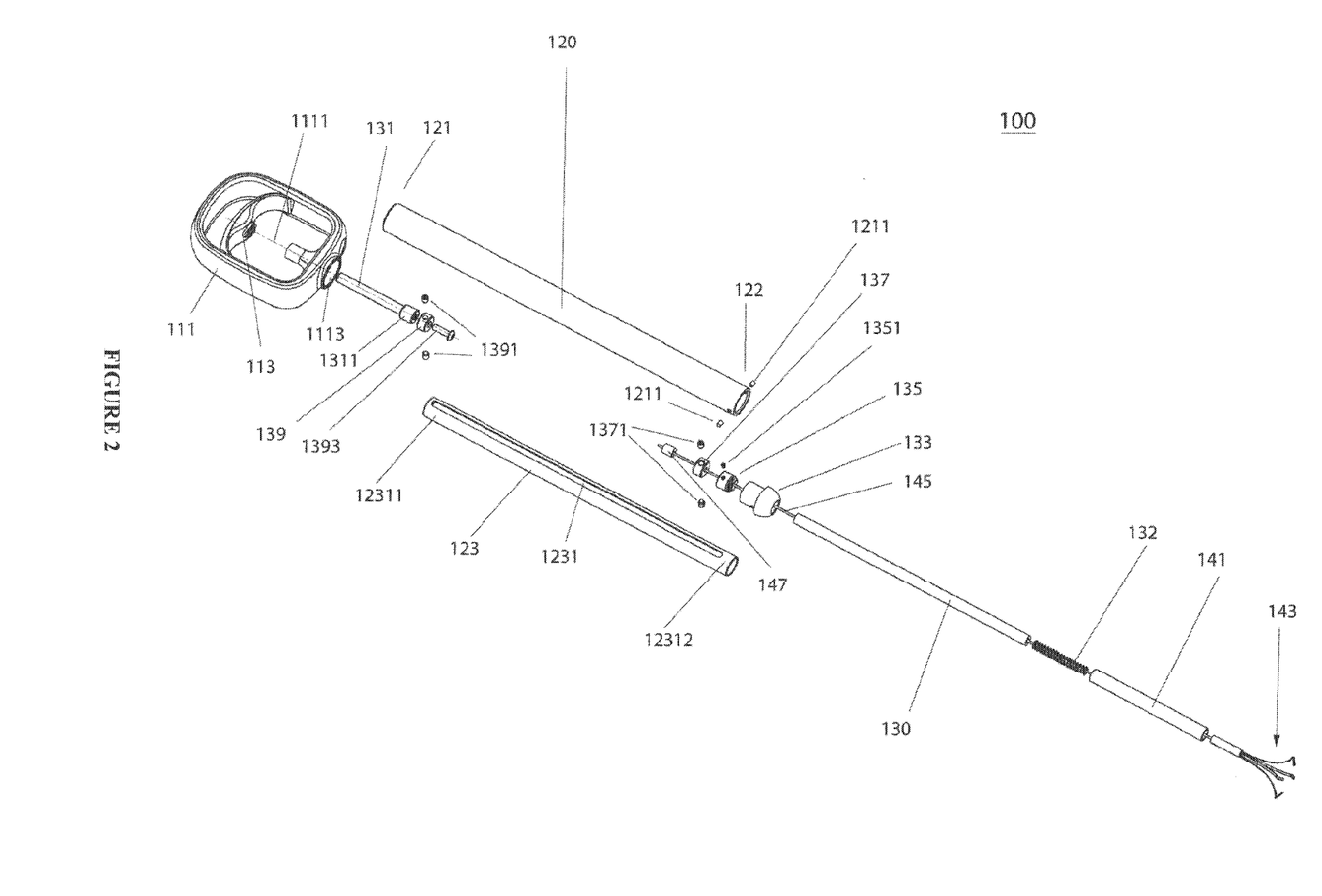
FIG. 2 illustrates an exploded view of an embodiment of a retrieving device.
Figure 3:
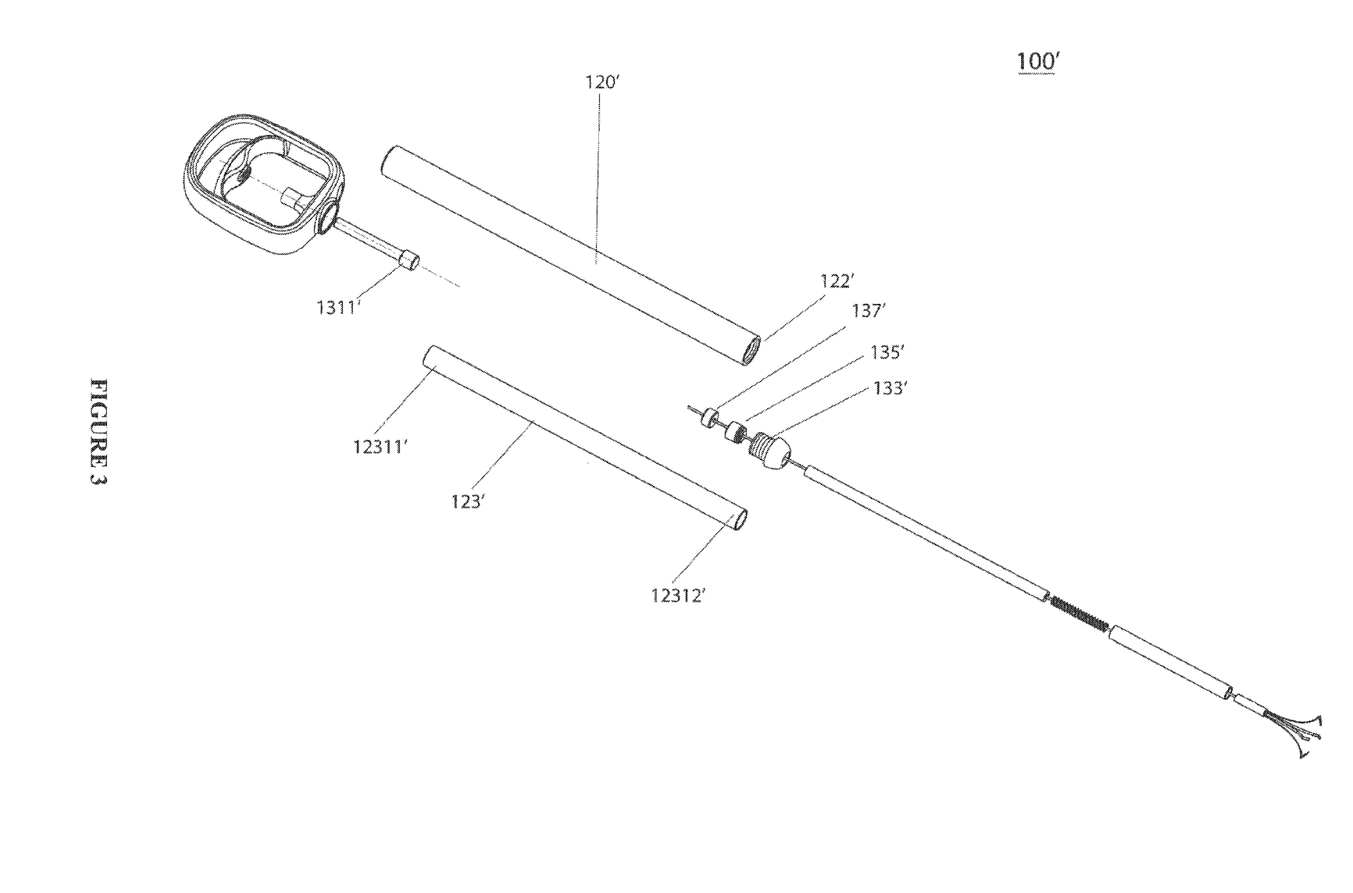
FIG. 3 illustrates an exploded view of another embodiment of a retrieving device.

FIGS. 1A, 1B and 2 illustrate various views of an example retrieving device 100 according to an embodiment of the present technology. FIG. 1A illustrates the retrieving device 100 in an extended configuration. FIG. 1B illustrates the retrieving device 100 in a retracted configuration. FIG. 2 illustrates an exploded view of the retrieving device 100. FIG. 3 illustrates an exploded view of another embodiment of a retrieving device 100'.

The retrieving device 100 comprises a handle 110, a proximate elongate member 120 having a tubular configuration, a flexible elongate member 130 having a tubular configuration, and a claw member 140. The proximate elongate member 120 with the tubular configuration in short is referred to as a proximate tubular member 120. The flexible elongate member 130 with the tubular configuration in short is referred to as a proximate tubular member 130. FIG. 1A also shows the claw member 140 and the flexible tubular member 130 an alternate configuration 130' and 140'—indicated by dashed lines.

The flexible tubular member 130 comprises a flexible jointed pipe (not specifically indicated in the figures). Various forms of flexible jointed pipe are sometimes referred to as a gooseneck. In some embodiments, the flexible tubular member 130 comprises only a flexible jointed pipe. In some other embodiments, the flexible tubular member 130 can include one or more rigid portions in addition to a flexible jointed pipe. The proximate tubular member 120 comprises a rigid plastic tube. The retrieving device 100 further comprises an actuating system and a releasable lock, each including multiple components as described herein and illustrated in more detail in FIG. 2.

In this example, as is explained in more detail herein, the actuating system of the example retrieving device 100 is configured to operatively couple the actuating member 113 and the claw member 140 when the flexible tubular member 130 is fully extended. Other embodiments may be configured to allow operatively coupling the actuating member with the claw member also when the flexible tubular member is only partially extended.

As illustrated in FIGS. 1A and 1B, the retrieving device 100 optionally includes an optional telescoping rod 180, and an optional battery operated light 190 with corresponding clamps. The optional telescoping rod 180, when detached and extended as desired, may be used in combination with the retrieving device 100 to aid the gripping of objects. The light 190 can be used to provide illumination when trying to grab objects in dark spaces. The clamps are configured to allow releasable attachment of the telescoping rod 180 and/or the light 190. The clamps are further configured to releasably attach to the proximate tubular member 120 as illustrated or at other locations along the proximate tubular member.

Turning to FIG. 2, the retrieving device 100 includes multiple components that may form part of the actuating system, the releasable lock and/or other subsystems of the retrieving device 100.

The handle 110 includes an actuating member 113 that is slidably coupled with the inside of a closed loop handle frame 111. The frame 111 is formed so it can rest in the palm of user's hand with the fingers grabbing the actuating member 113, for example. Pulling on the actuating member 113 slides the actuating member 113 inside the handle frame 111 toward the palm of the hand and along axis 1111.

The actuating member 113 is attached to rod 131, for example via a threaded, glue or other connection. The rod 131 can slide along axis 1111 through an opening 1113 in the handle frame 111 of the handle 110. The rod 131 has an internal thread arranged at end 1311 that is configured to receive screw 1393. Screw 1393 has a length that is sufficient to receive a cylindrical slider 139 and fasten same to rod 131. The cylindrical slider 139 is configured to slide within actuating tube 123 along axis 1111. The actuating tube 123 has two slits 1231 (only one illustrated) arranged lengthwise on opposite sides thereof. The slits 1231 extend from proximate end 12311 to distal end 12312 of the actuating tube 123 along a portion of the length of the actuating tube 123. The length of the slits in part determines by how much the flexible tubular member 130 can be extended from the proximate tubular member 120. Two screws 1391 are fastened to opposite sides of the cylindrical slider 139 and protrude radially from the cylindrical slider 139 and into the slits 1231. The protruding portions of the screws 1391 may be smooth, threaded or otherwise shaped. The protruding portions of the screws 1391 are configured to engage with the slits 1231 in a sliding fashion. When flexible tubular member 130 is extended, referred to as the extended configuration, the two screws 1391 engage the proximate end 12311 of the two slits 1231 near the handle 110.

The proximate tubular member 120 has an external thread at proximate end 121 near the handle frame 111 configured to fasten to an internal thread inside opening 1113. The proximate tubular member 120 is configured to receive two setscrews 1211 near a distal end 122. The two setscrews 1211 are configured to fasten locking member 133 to the proximate tubular member 120. Locking member 133 has an internal thread configured to match an external thread provided by counter locking member 135 in order to fasten the two parts together. Internal and external threads may be reversed in other embodiments. The screw coupling provided by the locking member 133 and the counterlocking member 135 can be configured to connect the two parts in a releasable manner with a number or fraction of turns while providing adequate strength of the resulting interconnection. Depending on the application, a small number or fraction of turns may ease locking the retrieving device.

The counterlocking member 135 is configured to accept one or more setscrews 1351 configured to fasten the counterlocking member 135 to the flexible tubular member 130. In some implementations, the counterlocking member 135 may be coupled with the flexible tubular member via a compression fit, by pressing, squeezing, soldering, by welding or gluing, or in other ways, for example.

The configuration of the example locking system allows the flexible tubular member 130 to be fastened to and released from the proximate tubular member 120 by establishing contact between the locking member 133 and the counterlocking member 135 by turning the flexible tubular member 130 relative to the proximate tubular member 120 in proper directions as determined by the handedness of the screw coupling provided by the locking system. The screw coupling can be released with corresponding reverse turns and the flexible tubular member 130 can be inserted back into actuating tube 123. This is referred to as the retracted configuration. In the retracted configuration the flexible tubular member 130 may loosely rest, be held in place via friction or otherwise held in place, inside the proximate tubular member 120 and the actuating tube 123.

The claw member 140 comprises a sleeve 141 into which the multiple claws 143 can be retracted and thereby closed, for example to grab an object. The claw member 140 is coupled to a stop 147 via a flexible rod 145. The flexible rod 145 can comprise a steel wire or other suitably flexible part, for example. The stop 147 can be a ferrule or other suitable part. In this example the claw member 140 and the stop 147 are attached to the flexible rod 145 via plastic deformation from a compression and thereby clamped. In other implementations, the claw member 140 and the stop 147 can be attached to the flexible rod 145 via setscrews, by pressing, squeezing, soldering, by welding or gluing, or coupled in other ways, for example.

The flexible rod 145 slidably runs through the sleeve 141, a spring 132, the flexible tubular member 130, the locking member 133, the counterlocking member 135, and a cylindrical slider 137 before it attaches to stop 147. The lengths of the sleeve 141, the spring 132, the flexible tubular member 130, the locking member 133, the counterlocking member 135, and the cylindrical slider 137, as well as the distance between the claw member 140 and the stop 147 are configured to bias the spring 132 in a manner sufficient to reliably extend the claws 143 from the sleeve 141 and to bias of the actuating member 113 proximate the proximate tubular member 120 when the user releases the actuating member 113 at least in the extended configuration. The spring 132 is disposed within the sleeve 141 between flexible tubular member 130 and the claw member 142.

In some embodiments, the flexible tubular member may have a diameter that is large enough to receive the claw member directly (not illustrated) without having to use a sleeve. In such embodiments, a spring may reach through a portion or the whole and beyond the flexible tubular member and be biased off of a part of the locking system, one of the cylindrical sliders or another part of the retrieving device.

Similarly to the cylindrical slider 139, the cylindrical slider 137 is configured to slide within actuating tube 123. Two screws 1371 are fastened to opposite sides of the cylindrical slider 139 and protrude radially and into the slits 1231. The screws 1371 are configured to engage with the slits 1231 in a sliding fashion. The protruding portions of the screws 1371 may be smooth, threaded or otherwise shaped. When the flexible tubular member 130 is extended, the two screws 1371 engage the distal end 12312 of the two slits 1231 near the flexible tubular member 130. As such, the claw member 140 can be operatively coupled and resiliently biased as further noted above via actuating tube 123, screws 1391, cylindrical slider 139 and rod 131 with the actuating member 113 in the extended configuration. In some implementations, the cylindrical slider 137 and the stop 147 are integrally formed.

FIG. 3 illustrates an exploded view of another embodiment of a retrieving device 100'. The retrieving device 100' is similar to the retrieving device 100 illustrated in FIG. 2, except for various aspects. For example, the actuating system of the retrieving device 100' comprises fewer components that engage in different manners. In particular, actuating tube 123' no longer requires slits compared to actuating tube 123. Moreover, the proximate end 12311' of the actuating tube 123' and end 1311' are configured to be coupled in one or more fixed ways via a compression fit, by pressing, squeezing, soldering, welding or gluing, coupled via setscrews or in other fixed ways, for example. Furthermore, distal end 12312' of the actuating tube 123' is configured to allow sliding of cylindrical slider 137' within the actuating tube 123' between a retracted configuration and an extended configuration but not beyond the extended configuration. In the retracted configuration the cylindrical slider 137' is located proximate the proximate end 12311', and in the extended configuration it is located proximate the distal end 12312'. The distal end 12312' is configured to retain the cylindrical slider 137' within the actuating tube 123' employing a suitable retention mechanism comprising a flange, a tapered or narrowing distal end 12312' or other retention mechanism such that the cylindrical slider 137' cannot be pulled out of actuating tube 123' once they are assembled without applying undue force.

Still referring to FIG. 3, proximate tubular member 120' and locking member 133' are configured to couple via a first screw coupling. For this purpose, distal end 122' has an inner thread and locking member 133' has a matching outer thread. The screw coupling can also be implemented by reversing the inner and outer thread on the respective parts (not illustrated). The proximate tubular member 120' and locking member 133' can also be soldered, welded, glued, press fit or otherwise permanently or releasably coupled together.

As described with respect to the retrieving device 100 illustrated in FIG. 2, the locking member 133' and the counterlocking member 135' are configured to couple via a second screw type fastening. For this purpose the locking member 133' has an internal thread (not visible in FIG. 3) and the counterlocking member 135' has a matching outer thread. Again, the inner and outer thread can be reversed on the respective parts. Depending on the embodiment, the first and second screw coupling can have the same or different handedness. A different handedness may be useful in maintaining a secure first screw coupling during enablement of the actuating system. When the retrieving device is assembled, the actuating system can be enabled as described herein.

In some embodiments, the retrieving device is configured to retract the holding member into a protective cavity in the retracted configuration (not illustrated). Such a cavity may be provided in various ways. For example, the locking member may be formed to provide a sufficiently long through hole to accommodate the holding member, or a sheath surrounding the sleeve may be provided that can be slid over the holding member. In such cases other subsystems of the retrieving device may require adequate configuration to accommodate the protective cavity.

In some embodiments, the locking member and the counterlocking member may be configured to provide a bayonet coupling (not illustrated) instead of a threaded screw coupling for interlocking the flexible and the proximate tubular member in the extended configuration. Depending on the embodiment, such a bayonet coupling may be configured to require pulling and twisting of the noted components in order to open or close the lock. Alternatively, the bayonet coupling may be configured to provide some play against a resilient bias beyond the extended configuration and may merely require a pull slightly beyond the extended configuration in order to open or close the lock. Respective mechanisms are known from retractable ball point pencils, for example.

Furthermore, the locking system may be configured to provide a releasable friction fit coupling for tubular members. Such friction fit couplings are known from adjustable telescoping walking poles or tool extension poles and can employ locking elements with concentric or eccentric arrangements relative to the axes of the locking and counterlocking members. Respective locking elements can be configured to exert friction against telescoping by pressing against the outer wall of the corresponding locking or counterlocking member when the friction fit coupling is twisted about the axes.

In some embodiments, the locking system can include a ball that is resiliently biased against the inside of the proximate tubular member and coupled with the flexible tubular member. The ball is configured to engage with one or more corresponding holes in the proximate tubular member to secure the length of the central portion by stopping translation of the flexible tubular member until the ball is depressed back into the hole.

It is noted that other embodiments of the present technology may employ differently configured actuating systems, locking systems, claw members, handles or other subsystems of other configurations.

In general, components of the grabbing device may be formed of plastic such as Nylon, PVC, acrylic, polycarbonate, ABS or other plastics, metal such as steel, brass, or other metal, or compound material such as glass or carbon fiber reinforced compound plastics, metals and/or other materials, for example.

It will be appreciated by those skilled in the art that the preferred embodiment has been described in some detail but that certain modifications may be practiced without departing from the principles of the invention.

What is claimed is:

1. A device for retrieving an object, the device comprising:
   a handle;
   a proximate elongate member extending from the handle;
   a flexible elongate member slidably coupled with the proximate elongate member, the flexible elongate member slidable between a retracted configuration and an extended configuration;
   a holding member comprising a sleeve and multiple claws, the holding member operatively coupled with a distal end of the flexible elongate member, the distal end being distal from the proximate elongate member; and
   an actuating system having an actuating member, the actuating system configured to operatively engage the actuating member and the holding member in at least the extended configuration of the flexible elongate member and thereby allow actuating the holding member to hold the object by actuating the actuating member;
   wherein the holding member is configured to retract the claws into the sleeve when actuating the actuating member.

2. The device according to claim 1, wherein the actuating member is operatively coupled with the handle.

3. The device according to claim 1, wherein at least portions of the proximate elongate member and the flexible elongate member have a tubular configuration and at least a portion of the actuating system is arranged within tubular portions of the proximate elongate member and the flexible elongate member.

4. The device according to claim 1, wherein at least a portion of the proximate elongate member has a tubular configuration and the flexible elongate member is slidably coupled with the tubular portion of the proximate elongate member in a telescoping manner.

5. The device according to claim 1, wherein the proximate elongate member is rigid.

6. The device according to claim 1, wherein the flexible elongate member comprises a flexible jointed pipe.

7. The device according to claim 1, wherein the actuating system is configured to retract the claws by pulling the actuating member away from the proximate elongate member.

8. The device according to claim 1, wherein at least in the extended configuration the actuating system is resiliently biased with the claws being in an open position and the actuating member in a position proximate the proximate elongate member.

9. The device according to claim 8, further comprising a spring configured to resiliently bias the actuating system.

10. The device according to claim 1, further comprising a locking system configured to releasably lock the flexible elongate member relative to the proximate elongate member.

11. The device according to claim 10, wherein the locking system is configured to lock the flexible elongate member relative to the proximate elongate member in the extended configuration.

12. The device according to claim 10, wherein the locking system comprises a screw coupling.

\* \* \* \* \*